(12) United States Patent
Edlund

(10) Patent No.: US 6,419,728 B1
(45) Date of Patent: Jul. 16, 2002

(54) HYDROGEN-PERMEABLE METAL MEMBRANE AND METHOD FOR PRODUCING THE SAME

(75) Inventor: David J. Edlund, Bend, OR (US)

(73) Assignee: IdaTech, LLC, Bend, OR (US)

(*) Notice: Subject to any disclaimer, the term of this patent is extended or adjusted under 35 U.S.C. 154(b) by 0 days.

(21) Appl. No.: 09/723,724

(22) Filed: Nov. 27, 2000

Related U.S. Application Data

(63) Continuation-in-part of application No. 09/274,154, filed on Mar. 22, 1999, now Pat. No. 6,152,995.

(51) Int. Cl.$^7$ ................................................ B01D 53/22
(52) U.S. Cl. ...................... 96/4; 95/56; 216/46; 216/53; 216/108
(58) Field of Search ............................ 95/45, 55, 56; 96/4, 11; 216/46, 53, 100, 108

(56) References Cited

U.S. PATENT DOCUMENTS

| | | |
|---|---|---|
| 2,824,620 A | 2/1958 | De Rosset |
| 3,208,198 A | 9/1965 | Rubin ............................ 55/16 |
| 3,336,730 A | 8/1967 | McBride et al. |
| 3,350,176 A | 10/1967 | Green et al. |
| 3,356,538 A | 12/1967 | Miekka et al. .......... 216/100 X |
| 3,368,329 A | 2/1968 | Eguchi et al. |
| 3,428,476 A | 2/1969 | Langley et al. |
| 3,439,474 A | 4/1969 | McKinley |
| 3,447,288 A | 6/1969 | Juda et al. |
| 3,450,500 A | 6/1969 | Setzer et al. |
| 3,469,372 A | 9/1969 | Yamauchi et al. ............. 96/11 |
| 3,469,944 A | 9/1969 | Bocard et al. |
| 3,520,803 A | 7/1970 | Iaconelli |
| 3,564,819 A | 2/1971 | Neulander et al. |
| 3,665,680 A | 5/1972 | Heuser ........................ 55/158 |
| 3,713,270 A | 1/1973 | Farr et al. ...................... 55/16 |
| 3,761,382 A | 9/1973 | Hammond et al. |
| 3,839,110 A | 10/1974 | Shankoff ..................... 216/108 |
| 3,849,076 A | 11/1974 | Gryaznov et al. |
| 3,881,891 A | 5/1975 | Goltsov et al. |
| 3,881,897 A | 5/1975 | Faure et al. |
| 3,972,695 A | 8/1976 | Buckley et al. |
| 4,003,725 A | 1/1977 | Bunn, Jr. et al. |
| 4,056,373 A | 11/1977 | Rubin |
| 4,132,668 A | 1/1979 | Gryaznov et al. .......... 252/430 |
| 4,197,152 A | 4/1980 | Palty et al. .................. 252/364 |
| 4,248,688 A | 2/1981 | Gartner et al. .......... 204/192 E |
| 4,254,086 A | 3/1981 | Sanders |
| 4,319,923 A | 3/1982 | Falanga et al. ............... 75/108 |

(List continued on next page.)

FOREIGN PATENT DOCUMENTS

| | | |
|---|---|---|
| EP | 1065741 A2 | 1/2001 |
| JP | 45-14404 | 5/1970 |
| JP | 45-2642 | 9/1970 |

(List continued on next page.)

OTHER PUBLICATIONS

English abstract of Japanese Patent No. 432150, 1992.
English abstract of Japanese Patent No. 513230, 1993.
English abstract of Japanese Patent No. 514790, 1993.
English abstract of Japanese Patent No. 604070, 1994.

(List continued on next page.)

Primary Examiner—Robert H. Spitzer
(74) Attorney, Agent, or Firm—Kolisch, Hartwell, Dickinson, McCormack & Heuser, PC

(57) ABSTRACT

A hydrogen-permeable metal membrane with increased hydrogen flux compared to conventional metal membranes is disclosed. Without sacrificing selectivity, the membrane enables a greater throughput of purified hydrogen. A method for preparing the invention includes at least one etching step in which a controlled volume of etchant is used to selectively remove material from the membrane's surface. Methods for repairing holes or other defects in the membrane are also disclosed.

38 Claims, 1 Drawing Sheet

U.S. PATENT DOCUMENTS

| | | | |
|---|---|---|---|
| 4,329,157 A | 5/1982 | Dobo et al. | 55/16 |
| 4,331,520 A | 5/1982 | Juda et al. | 204/105 R |
| 4,422,911 A | 12/1983 | Juda et al. | 204/106 |
| 4,468,235 A | 8/1984 | Hill | |
| 4,472,176 A | 9/1984 | Rubin | |
| 4,589,891 A | 5/1986 | Iniotakis et al. | |
| 4,650,814 A | 3/1987 | Keller | 518/703 |
| 4,654,063 A | 3/1987 | Auvil et al. | 62/18 |
| 4,655,797 A | 4/1987 | Iniotakis et al. | |
| 4,684,581 A | 8/1987 | Struthers | 429/19 |
| 4,713,234 A | 12/1987 | Weirich et al. | 423/648 R |
| 4,810,485 A | 3/1989 | Marianowski et al. | 423/648.1 |
| 4,849,187 A | 7/1989 | Uozu et al. | |
| 4,981,676 A | 1/1991 | Minet et al. | |
| 4,999,107 A | 3/1991 | Guerif | |
| 5,126,045 A | 6/1992 | Kohlheb et al. | |
| 5,139,541 A | 8/1992 | Edlund | |
| 5,158,581 A | 10/1992 | Coplan | |
| 5,205,841 A | 4/1993 | Vaiman | |
| 5,215,729 A | 6/1993 | Buxbaum | 95/56 X |
| 5,217,506 A | 6/1993 | Edlund et al. | |
| 5,225,080 A | 7/1993 | Karbachsch et al. | |
| 5,229,102 A | 7/1993 | Minet et al. | |
| 5,259,870 A | 11/1993 | Edlund | |
| 5,326,550 A | 7/1994 | Adris et al. | 423/652 |
| 5,354,547 A | 10/1994 | Rao et al. | 423/650 |
| 5,376,167 A | 12/1994 | Broutin et al. | |
| 5,393,325 A | 2/1995 | Edlund | 95/56 |
| 5,449,848 A | 9/1995 | Itoh | 585/430 |
| 5,498,278 A | 3/1996 | Edlund | 96/11 |
| 5,500,122 A | 3/1996 | Schwartz | |
| 5,509,942 A | 4/1996 | Dodge | 29/623.2 |
| 5,518,530 A | 5/1996 | Sakai et al. | |
| 5,520,807 A | 5/1996 | Myrna et al. | |
| 5,525,322 A | 6/1996 | Willms | 423/653 |
| 5,536,405 A | 7/1996 | Myrna et al. | |
| 5,612,012 A | 3/1997 | Soma et al. | 423/246 |
| 5,637,259 A | 6/1997 | Galuszka et al. | 252/373 |
| 5,639,431 A | 6/1997 | Shirasaki et al. | 422/212 |
| 5,645,626 A | 7/1997 | Edlund et al. | 95/56 |
| 5,658,681 A | 8/1997 | Sato et al. | 429/13 |
| 5,705,082 A | 1/1998 | Hinson | 216/100 X |
| 5,705,916 A | 1/1998 | Rudbeck et al. | 322/2 R |
| 5,734,092 A | 3/1998 | Wang et al. | 73/23.25 |
| 5,738,708 A | 4/1998 | Peachey et al. | |
| 5,782,960 A | 7/1998 | Ogawa et al. | 96/11 |
| 5,814,112 A | 9/1998 | Elliot et al. | 48/197 R |
| 5,821,185 A | 10/1998 | White et al. | |
| 5,858,314 A | 1/1999 | Hsu et al. | |
| 5,861,137 A | 1/1999 | Edlund | 423/652 |
| 5,888,273 A | 3/1999 | Buxbaum | |
| 5,904,754 A | 5/1999 | Juda et al. | 96/11 |
| 5,931,987 A | 8/1999 | Buxbaum | 95/55 |
| 5,938,800 A | 8/1999 | Verrill et al. | |
| 5,997,594 A | 12/1999 | Edlund et al. | 48/76 |
| 6,103,028 A | 8/2000 | Juda et al. | 148/678 |
| 6,152,995 A | 11/2000 | Edlund | 96/4 |
| 6,168,650 B1 | 1/2001 | Buxbaum | 95/55 |
| 6,171,574 B1 | 1/2001 | Juda et al. | |
| 6,183,543 B1 | 2/2001 | Buxbaum | 96/11 |
| 6,221,117 B1 | 4/2001 | Edlund et al. | 48/76 |
| 6,238,465 B1 | 5/2001 | Juda et al. | |

FOREIGN PATENT DOCUMENTS

| | | | |
|---|---|---|---|
| JP | 1-145302 | 6/1989 | |
| JP | 1-145303 | 6/1989 | |
| JP | 1-262903 | 10/1989 | 96/11 |
| JP | 6-134244 | 5/1994 | |
| WO | WO97/43796 | 11/1997 | |
| WO | WO99/30806 | 6/1999 | |

OTHER PUBLICATIONS

English abstract of Japanese Patent No. 634540.

English abstract of Japanese Patent No. 710910, 1995.

English abstract of Japanese Patent No. 11116202, 1999.

Adris, A. M., et al., "A Fluidized Bed Membrane Reactor for the Steam Reforming of Methane," The Canadian Journal of Chemical Engineering, vol. 69, pp. 1061–1070 (Oct., 1991).

Amphlett, J. C., et al., "On Board Hydrogen Purification for Steam Reformer/PEM Fuel Cell Vehicle Power Plants," Energy Progress X, Proceedings of the $10^{th}$ World Hydrogen Energy Conference, Cocoa Beach, Florida, U.S.A., vol. 3, pp. 1681–1690 (Jun., 1994).

Amphlett, J. C., et al., "Simulation of a 250 kW Diesel Fuel Processor/PEM Fuel Cell System," Fifth Grove Fuel Cell Symposium, Commonwealth Institute, London, U.K., p. 8 (Sep. 22–25, 1997).

Chai, M., et al., "Promotion of Methane Steam Reforming Using Ruthenium–Dispersed Microporous Alumina Membrane Reactor," Chemistry Letters, The Chemical Society of Japan, pp. 41–44 (1993).

"Compact, Lightweight Fuel Reformer for Fuel Cells," Argonne National Laboratory/U.S. Department of Energy (Jul., 1996).

Edlund, Dr. David and William Pledger, "Development of a Compact and Economical Steam Reformer for Fuel–Cell Systems," Fifth Grove Fuel Cell Symposium, Commonwealth Institute, London, U.K., p. 6 (Sep. 22–23, 1997).

Edlund, Dr. David J. and William A. Pledger, "The Practical Use of Metal–Membrane Reactors for Industrial Applications," The 1995 Membrane Technology Reviews, pp. 89–97 (Nov., 1994).

Emonts, B., et al., "Compact Methanol Reformer Test for Fuel–Cell Powered Light–Duty Vehicles," Fifth Grove Fuel Cell Symposium, Commonwealth Institute, London, U.K., p. 42 (Sep. 22–25, 1997).

Emonts, B., et al., "Compact Methanol Reformer Test for Fuel–Cell Powered Light–Duty Vehicles," Fifth Grove Fuel Cell Symposium, Commonwealth Institute, London, U.K., (no page No.), (Sep. 22–25, 1997).

Jørgensen, S. Laegsgaard, et al., "Application of Pd–Membranes for the Production of Pure Hydrogen in Methanol–Based Fuel Cell Powered Vehicles," Proceedings of Fourth Workshop: Optimisation of Catalytic Membrane Reactor Systems, ESF Network, Catalytic Membrane Reactors, Oslo, Norway, pp. 51–57 (May 30–31, 1997).

Knapton, A. G., "Palladium Alloys for Hydrogen Diffusion Membranes," Platinum Metals Review, vol. 21, 44–50 (1977).

Ledjeff–Hey, K., et al., "Compact Hydrogen Production Systems for Solid Polymer Fuel Cells," Fifth Grove Fuel Cell Symposium, Commonwealth Institute, London, U.K., p. 17 (Sep. 22–25, 1997).

Menzer, R., et al., "Fuel Processing in Fuel Cell Systems for Mobile Applications—Gasoline as Energy Carrier On–Bord," Fifth Grove Fuel Cell Symposium, Commonwealth Institute, London, U.K., (no page No.), (Sep. 22–25, 1997).

Minet, R. G., et al., "Experimental Studies of A Ceramic Membrane Reactor for the Steam/Methane Reaction at Moderate Temperatures (400–700° C)," Symposium on Natural Gas Upgrading II Presented before The Division of Petroleum Chemistry, Inc., Meeting of American Chemical Society, San Francisco, California, U.S.A., pp. 245–248 (Apr., 1992).

Oertel, Michael, et al., "Steam Reforming of Natural Gas with Integrated Hydrogen Separation for Hydrogen Production," Chemical Engineering Technology, vol. 10, pp. 248–255 (1987).

Shu, J., et al., "Catalytic Palladium–Based Membrane Reactors: A Review," The Canadian Journal of Chemical Engineering, vol. 69, pp. 1036–1060 (Oct., 1991).

Teagan, W. P., et al., "Cost Reducton of Fuel Cells for Transporation Applications—Fuel Processing Options," Fifth Grove Fuel Cell Symposium, Commonwealth Institute, London, U.K. (Sep. 22–25, 1997).

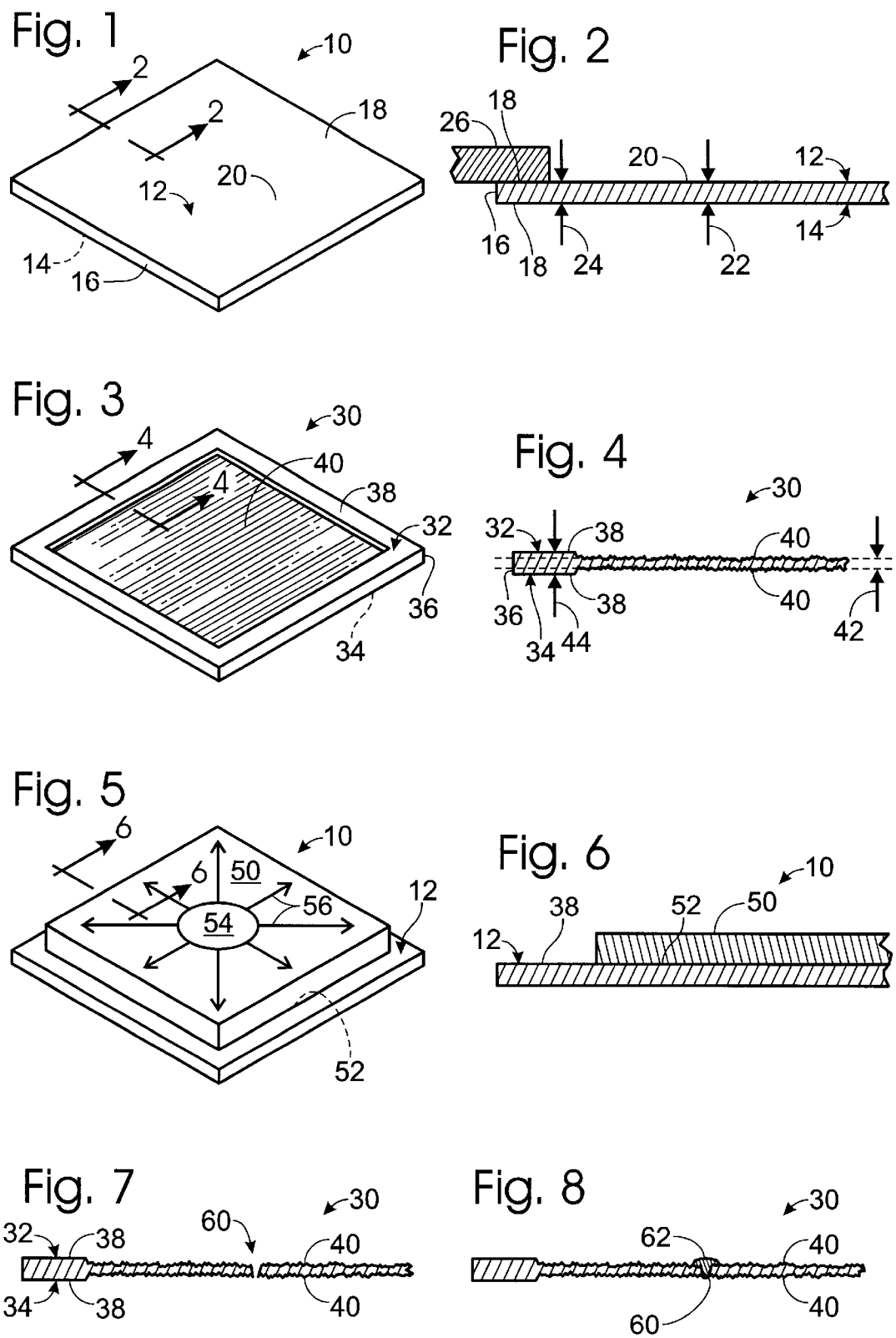

HYDROGEN-PERMEABLE METAL MEMBRANE AND METHOD FOR PRODUCING THE SAME

RELATED APPLICATION

The present application is a continuation-in-part patent application claiming priority to similarly-entitled U.S. patent application Ser. No. 09/274,154, which was filed on Mar. 22, 1999, will issue on Nov. 28, 2000 as U.S. Pat. No. 6,152,995, and the disclosure of which is hereby incorporated by reference.

FIELD OF THE INVENTION

The present invention relates generally to hydrogen-permeable membranes, and more particularly to a hydrogen-permeable membrane with increased hydrogen permeability and a method for producing the same.

BACKGROUND AND SUMMARY OF THE INVENTION

Purified hydrogen is used in the manufacture of many products including metals, edible fats and oils, and semiconductors and microelectronics. Purified hydrogen is also an important fuel source for many energy conversion devices, such as fuel-cell systems, and especially proton-exchange-membrane fuel-cell (PEMFC) systems. For example, fuel cells use purified hydrogen and an oxidant to produce an electrical potential. By chemical reaction, a process known as steam reforming produces hydrogen and certain byproducts or impurities. A subsequent purification process removes the undesirable impurities to provide hydrogen sufficiently purified for application to a fuel cell. Examples of fuel-cell systems are disclosed in U.S. Pat. No. 5,861,137, and U.S. patent applications Ser. Nos. 08/951,091 and 09/190,917, the disclosures of which are hereby incorporated by reference.

The invention includes a hydrogen-permeable metal membrane with increased hydrogen flux compared to conventional hydrogen-permeable metal membranes. Without sacrificing selectivity or purity, the membrane enables a greater hydrogen throughput. A method for preparing the membrane includes at least one etching step in which a volume of etchant is used to selectively remove material from the membrane's surface. Methods for detecting and repairing holes or other defects in the membrane are also disclosed.

Many other features of the present invention will become manifest to those versed in the art upon making reference to the detailed description which follows and the accompanying drawings in which preferred embodiments incorporating the principles of this invention are disclosed as illustrative examples only.

BRIEF DESCRIPTION OF THE DRAWINGS

FIG. 1 is an isometric view of an unetched hydrogen-permeable metal membrane.

FIG. 2 is a cross-sectional detail of the membrane of FIG. 1 with an attached frame.

FIG. 3 is an isometric view of the membrane of FIG. 1 after being etched according to a method of the present invention.

FIG. 4 is a cross-sectional detail of the membrane of FIG. 3.

FIG. 5 is an isometric view of the membrane of FIG. 1 with an absorbent medium placed over an application region of one of the membrane's surfaces.

FIG. 6 is a cross-sectional detail of the membrane of FIG. 5.

FIG. 7 is the detail of FIG. 4 with a hole indicated generally at 60.

FIG. 8 is the detail of FIG. 7 with the hole repaired.

DETAILED DESCRIPTION OF THE INVENTION

An unetched hydrogen-permeable membrane is shown in FIG. 1 and indicated generally at 10. Membrane 10 includes a pair of generally opposed surfaces 12 and 14 and an edge 16 joining the perimeters of the surfaces. Each surface 12 and 14 includes an outer edge region 18 that surrounds a central region 20. Membrane 10 is typically roll formed and, as shown, has a generally rectangular, sheet-like configuration with a constant thickness. It should be understood that membrane 10 may have any geometric or irregular shape, such as by cutting the formed membrane into a desired shape based on user preferences or application requirements.

In FIG. 2, membrane 10 is shown in cross-section, and it can be seen that the thickness 22 of the membrane measured between the central regions is the same as the thickness 24 measured between the edge regions. In the figures, it should be understood that the thicknesses of the membranes and subsequently described absorbent media and frame have been exaggerated for purposes of illustration. Typically, hydrogen-permeable membranes have thicknesses less than approximately 50 microns, although the disclosed etching process may be used with thicker membranes.

Also shown in FIG. 2 is a portion of a frame 26, which may be secured to the membrane, such as around a portion or the entire edge region 18. Frame 26 is formed from a more durable material than the membrane and provides a support structure for the membrane. Frame 26 may be secured to one or both surfaces of the membrane.

In use, membrane 10 provides a mechanism for removing hydrogen from mixtures of gases because it selectively allows hydrogen to permeate through the membrane. The flowrate, or flux, of hydrogen through membrane 10 typically is accelerated by providing a pressure differential between a mixed gaseous mixture on one side of the membrane, and the side of the membrane to which hydrogen migrates, with the mixture side of the membrane being at a higher pressure than the other side.

Membrane 10 is formed of a hydrogen-permeable metal or metal alloy, such as palladium or a palladium alloy. An example of such an alloy is comprised of 60 wt % palladium and 40 wt % copper (generally known as Pd- 40Cu). Because palladium and palladium alloys are expensive, the thickness of the membrane should be minimal; i.e., as thin as possible without introducing an excessive number of holes in the membrane. Holes in the membrane are not desired because holes allow all gaseous components, including impurities, to pass through the membrane, thereby counteracting the hydrogen-selectivity of the membrane.

It is known to roll form hydrogen-permeable metal membranes, such as membrane 10, to be very thin, such as with thicknesses of less than approximately 50 microns, and more commonly with thicknesses of approximately 25 microns. The flux through a hydrogen-permeable metal membrane is inversely proportional to the membrane thickness. Therefore, by decreasing the thickness of the membrane, it is expected that the flux through the membrane will increase, and vice versa. In Table 1, below, the expected flux of hydrogen through various thicknesses of Pd-40Cu membranes is shown.

TABLE 1

Expected hydrogen flux through Pd-40Cu membranes at 400° C. and 100 psig hydrogen feed, permeate hydrogen at ambient pressure.

| Membrane Thickness | Expected Hydrogen Flux |
| --- | --- |
| 25 micron | 60 mL/cm$^2$ · min |
| 17 micron | 88 mL/cm$^2$ · min |
| 15 micron | 100 mL/cm$^2$ · min |

Besides the increase in flux obtained by decreasing the thickness of the membrane, the cost to obtain the membrane also increases as the membrane's thickness is reduced. Also, as the thickness of a membrane decreases, the membrane becomes more fragile and difficult to handle without damaging.

Through the etching process, or method, of the present invention, discussed in more detail subsequently, the thickness of a portion of the membrane, such as central portion 20, may be selectively reduced, while leaving the remaining portion of the membrane, such as edge region 18, at its original thickness. Therefore, greater flux is obtained in the thinner etched region, while leaving a thicker, more durable edge region that bounds the central region and thereby provides support to the membrane.

For example, an etched membrane prepared according to an etching method of the present invention is shown in FIG. 3 and illustrated generally at 30. Like membrane 10, membrane 30 includes a pair of generally opposed surfaces 32 and 34 and an edge 36 joining the surfaces. Each surface 32 and 34 includes an outer edge region 38 that surrounds a central region 40. Membrane 30 is formed from any of the above-discussed hydrogen-permeable metal materials, and may have any of the above-discussed configurations and shapes. The etching process works effectively on work-hardened, or non-annealed membranes. Alternatively, the membrane may be annealed prior to the etching process. Unlike membrane 10, however, the thickness 42 of membrane 30 measured between central regions 40 is less than the thickness 44 measured between the edge regions, as schematically illustrated in FIG. 4. Therefore, the hydrogen flux through the central region will be greater than that through the edge region, as expected from the above discussion of the inversely proportional relationship between membrane thickness and hydrogen flux.

However, an unexpected benefit of chemically etching the membrane, as disclosed herein, is that the hydrogen flux through the etched region exceeds that expected or measured through roll-formed membranes of equal thickness. As shown below in Table 2, the method of the present invention yields a hydrogen-permeable metal membrane with significantly greater flux than unetched membranes of similar thicknesses.

TABLE 2

Hydrogen flux through etched and unetched Pd-40Cu membranes at 400° C. and 100 psig hydrogen feed, permeate hydrogen at ambient pressure. Aqua regia etchant.

| Etching Time | Membrane Thickness | Observed Hydrogen Flux | Expected Hydrogen Flux |
| --- | --- | --- | --- |
| None | 25 micron | 60 mL/cm$^2$ · min | 60 mL/cm$^2$ · min |
| 2.0 mins. | 17 micron | 94 mL/cm$^2$ · min | 88 mL/cm$^2$ · min |
| 2.5 mins. | 15 micron | 122 mL/cm$^2$ · min | 100 mL/cm$^2$ · min |

As the above table demonstrates, the invented method produces hydrogen-permeable metal membranes that permit increased hydrogen throughput compared to unetched membranes of similar thickness by increasing the roughness and surface area of the etched region of the membrane. Perhaps more importantly, this increase in throughput is achieved without sacrificing selectivity for hydrogen or the purity of the harvested hydrogen gas which is passed through the membrane.

Increasing the surface roughness of the membrane is especially beneficial as the thickness of the membrane is reduced to less than 25 microns, especially less than 20 microns. As the membrane thickness is reduced, the surface reaction rates governing the transport of gaseous molecular hydrogen onto the surface of the metal membrane become more important to the overall permeation rate of hydrogen across the membrane. In extreme cases in which the membrane is quite thin (less than approximately 15 microns) the surface reaction rates are significant in governing the overall permeation rate of hydrogen across the membrane. Therefore, increasing the surface area increases the rate of hydrogen permeation. This contrasts with relatively thick membranes (greater than 25 microns) in which the surface reaction rates are less important and the overall permeation rate of hydrogen across the membrane is governed by the bulk diffusion of hydrogen through the membrane.

Thus the etching process results in an overall reduction in the thickness of the membrane and an increase in the surface roughness (and surface area) of the membrane. These improvements yield an increase in hydrogen flux and reduce the amount of material (e.g., palladium alloy) that is required, while still maintaining the membrane's selectivity for hydrogen.

In the invented etching process, an etchant is used to selectively reduce the thickness of the membrane. When the etchant removes, or etches, material from the surface of a membrane, the etchant also increases the surface roughness and surface area of the membrane in the etched region.

Examples of suitable etchants are oxidizing agents and acids. For example, oxidizing acids such as nitric acid. Other suitable examples are combinations of nitric acid with other acids, such as aqua regia (a mixture of 25 vol % concentrated nitric acid and 75 vol % concentrated hydrochloric acid). Another specific example of an etchant well-suited to use in the present invention is a mixture comprising 67 wt % concentrated nitric acid and 33 wt % aqueous solution of poly(vinyl alcohol). A suitable method of preparing the aqueous solution of poly(vinyl alcohol) is to dissolve 4 wt % of poly(vinyl alcohol) (average molecular weight 124,000 to 186,000; 87% to 89% hydrolyzed; Aldrich Chemical Company, Milwaukee, Wis.) in de-ionized water. The disclosed examples of etchants are for illustrative purposes, and should not be construed to be limiting examples. For example, the relative percentage of acid may be increased or decreased to make the etchant respectively more or less reactive, as desired.

In a first method of the present invention, a selected etchant is applied to at least one of the surfaces of the membrane. Once applied, the etchant removes material from the surface of the membrane, thereby increasing its surface roughness and reducing the thickness of the membrane in the etched region. After a defined time period, the etchant is removed. The etching process disclosed herein typically is conducted under ambient conditions (temperature and pressure), although it should be understood that the process could be conducted at elevated or reduced temperatures and pressures as well.

The etching process is limited either by the time during which the membrane is exposed to the etchant, or by the reactive elements of the etchant. In the latter scenario, it should be understood that the etching reaction is self-limiting, in that the reaction will reach an equilibrium state in which the concentration of dissolved membrane in the etchant solution remains relatively constant. Regardless of the limiting factor in the process, it is important to apply a volume and concentration of etchant for a time period that will not result in the etchant creating substantial holes in, or completely dissolving, the membrane. Preferably, no holes are created in the membrane during the etching process.

When applying the etchant to a surface of membrane 10, such as to produce membrane 30, it is desirable to control the region of the surface over which the etchant extends. It is also desirable to maintain an even distribution of etchant over this application region. If the application region of the etchant is not controlled, then the etchant may remove material from other non-desired regions of the membrane, such as the edge region, or may damage materials joined to the membrane, such as an attached frame. If an even distribution of etchant is not maintained, areas of increased etchant may have too much material removed, resulting in holes in the membrane. Similarly, other areas may not have enough material removed, resulting in less than the desired reduction in thickness and increase in flux.

To control the distribution of etchant within the desired application region, an absorbent medium is placed on the membrane 10 and defines an application region to be etched. For example, in FIGS. 5 and 6, the absorbent medium is generally indicated at 50 and covers application region 52 of surface 12. As shown, medium 50 is sized to cover only a central portion of surface 12, however, it should be understood that medium 50 may be selectively sized to define application regions of any desired size and shape, up to the complete expanse of surface 12. Typically, however, only a central portion of each surface is treated, leaving an unetched perimeter of greater thickness than the central region. This unetched region, because of its greater thickness, provides strength and support to membrane 10 while still contributing to the hydrogen permeability of the membrane.

Besides being selected to absorb the particular etchant without adversely reacting to the etchant or metal membrane, it is preferable that medium 50 has a substantially uniform absorbency and diffusivity along its length. When medium 50 absorbs and distributes the etchant uniformly along its length, it distributes the etchant evenly across the application region, thereby removing substantially the same amount of material across the entire application region. The benefit of this is not only that some etchant will contact, and thereby remove material from, the entire application region, but also that the etchant will be uniformly distributed across the application region. Therefore, membrane 50 prevents too much etchant being localized in an area, which would result in too much material being removed. In a region where too much etchant is applied, the excess etchant is drawn away from that region to other areas of the medium where less etchant is applied. Similarly, in a region where too little etchant is applied, the medium draws etchant to that region to produce an even distribution across the medium, and thereby across the application region.

As a result, the reduction of thickness in membrane 10 will be relatively uniform across the application region, and perhaps more importantly will be reproducible regardless of the exact rate and position at which the etchant is applied. Therefore, with the same size and type of medium 50 and the same volume of etchant 54, the resulting reduction in thickness should be reproducible for membranes of the same composition. Of course, it should be understood that etching removes material from the surface of the membrane, thereby resulting in an uneven, rough surface with increased surface area over an unetched surface. Therefore, the exact surface topography will not be seen. However, the average thickness measured across a section of the membrane should be reproducible. For example, in FIG. 4, the average thickness between central regions 40 is indicated with dashed lines.

Because medium 50 essentially defines the bounds of application region 52, medium 50 should be sized prior to placing it upon the surface to be etched. After placing the medium in the desired position on one of the membrane's surfaces, such as surface 12 shown in FIG. 5, a volume of etchant is applied. In FIG. 5, the applied volume of etchant is schematically illustrated at 54, with arrows 56 illustrating the absorption and distribution of etchant 54 across medium 50.

The applied volume of etchant should be no more than a saturation volume of etchant. An absorbent medium can only absorb up to a defined volume of a particular etchant per unit of medium 50 before reaching the saturation point of the medium. Therefore, it is important not to exceed this saturation point. Too much applied etchant will result in unabsorbed etchant pooling on or adjacent the medium, such as on the upper surface of medium 50 or around the edges of the medium. When excess etchant contacts the surface, it is likely to result in holes in the membrane because more than the desired amount of material is removed. As discussed, if these holes are numerous or large enough, they will render the membrane unusable for hydrogen purification applications, with any holes lowering the purity of the hydrogen passing through the membrane.

Therefore, to prevent too much etchant from being applied, the volume of etchant applied may approach, but should not exceed, the saturation volume of the etchant.

An example of a suitable absorbent medium is a cellulosic material, such as absorbent paper products. A particular example of an absorbent medium that has proven effective is single-fold paper towels manufactured by the Kimberly Clark Company. When a three inch by three inch area of such a towel is used, approximately 2.5 mL of etchant may be applied without exceeding the saturation volume of that area. The capillary action of the cellulosic towel both absorbs the applied etchant and distributes the etchant throughout the towel. Other paper and cellulosic materials may be used as well, as long as they meet the criteria defined herein. Absorbent, diffusive materials other than cellulosic materials may be used as well.

After applying the etchant to medium 50, the etchant is allowed to remove material from the application region for a determined time period. This period is best determined through experimentation and will vary depending on such factors as the composition, thickness and desired thickness of the membrane, the absorbent medium being used, the composition and concentration of etchant, and the temperature at which the etching process is conducted. After this time period has passed, the medium is removed from the membrane, and the application, or treatment, area is rinsed with water to remove any remaining etchant. After rinsing, the method may be repeated to etch another surface of the membrane.

Instead of a single etching step on each surface of the membrane, a variation of the above method includes plural etching steps for each surface to be etched. In the first step, a more reactive, or vigorous etchant is used to remove a substantial portion of the material to be removed. In the second step, a less reactive etchant is used to provide a more controlled, even etch across the application region.

As an illustrative example, Pd-40Cu alloy foil was etched first with concentrated nitric acid for 20–30 seconds using the absorbent medium technique described above. After removing the medium and rinsing and drying the membrane, a second etch with a mixture of 20 vol % neat ethylene glycol and the balance concentrated nitric acid was performed for between 1 and 4 minutes. Subsequent etching steps were performed with the glycol mixture to continue to gradually reduce the thickness of the membrane in the application region. Results of etching Pd-40Cu foil using this method are given in the table below.

TABLE 3

Results of etching Pd-40Cu membrane with concentrated nitric acid for 30 seconds followed by subsequent etches with concentrated nitric acid diluted with 20% vol ethylene glycol.

| Etching Solution | Etching Time | Observations |
|---|---|---|
| None (Virgin Pd-40Cu Foil) | N/A | Measures 0.0013 inches thick |
| 1) Conc. Nitric Acid<br>2) 20 vol % ethylene glycol/HNO$_3$ | 1) 30 seconds<br>2) 1.5 minutes | Measures 0.0008 to 0.0009 inches thick, no pin holes |
| 1) Conc. Nitric Acid<br>2) 20 vol % ethylene glycol/HNO$_3$<br>3) 20 vol % ethylene glycol/HNO$_3$ | 1) 30 seconds<br>2) 1.5 minutes<br>3) 1.5 minutes | Measures 0.0005 to 0.0006 inches thick, no pin holes |
| 1) Conc. Nitric Acid<br>2) 20 vol % ethylene glycol/HNO$_3$ | 1) 30 seconds<br>2) 3 minutes | Measures 0.0005 inches thick, no pin holes in membrane |
| 1) Conc. Nitric Acid<br>2) 20 vol % ethylene glycol/HNO$_3$ | 1) 1 minute<br>2) 3 minutes | Multiple pin holes in membrane |

Other than confining the etching solution to a desired application region, another benefit of using an absorbent medium to control the placement and distribution of the etchant is that the quantity of etchant (or etching solution) that may be applied without oversaturating the medium is limited. Thus, the etching reaction may be self-limiting, depending on the choice of and composition of etchant. For instance, varying the etching time using 33.3 wt % PVA solution/66.7 wt % concentrated HNO$_3$ yielded the results shown in the following table. These results indicate that the volume of etchant that is applied at one time may limit the depth of etching, so long as the etchant is not so reactive or applied in sufficient quantity to completely dissolve the application region.

TABLE 4

Results of etching Pd-40Cu membrane with a solution of 33.3 wt % PVA solution/66.7 wt % concentrated nitric acid.

| Etching Time | Observations |
|---|---|
| 0 | Measures 0.0013 inches thick |
| 3 minutes | Measures 0.0011 inches thick |
| 4 minutes | Measures 0.0011 inches thick |
| 5 minutes | Measures 0.0011 inches thick |
| 6 minutes | Measures 0.0011 inches thick |
| 3 minutes, rinse, 3 minutes | Measures 0.0008 to 0.0009 inches thick |
| 3 minutes, rinse, 3 minutes, rinse, 3 minutes | Measures 0.0006 inches thick, multiple pin holes |

In a further variation of the etching method, a suitable mask may be applied to the membrane to define the boundaries of the region to be etched. For example, in FIG. 5, instead of using absorbent medium 50 to define application region 52, a non-absorbent mask could be applied around edge region 38. Because this mask does not absorb the etchant, it confines the etchant to an application region bounded by the mask. Following etching, the mask is removed. The mask may be applied as a liquid or it may be a film with an adhesive to bond the film to the membrane.

If the chemical etching process is not properly controlled, tiny holes will appear in the membrane. For example, in FIG. 7 membrane 30 is shown with a hole 60 in its central region 40. Typically, the holes will be very small, however, the size of a particular hole will depend on the concentration and quantity of etchant applied to that region, as well as the time during which the etchant was allowed to etch material from the membrane. Holes, such as hole 60, reduce the purity of the hydrogen gas harvested through the membrane, as well as the selectivity of the membrane for hydrogen. The probability of holes forming in the membrane during the etching process increases as the thickness of the membrane is reduced. Therefore, there is often a need to repair any holes formed during the etching process.

One method for detecting any such holes is to utilize a light source to identify holes in the membrane. By shining a light on one side of the membrane, holes are detected where light shines through the other side of the membrane. The detected holes may then be repaired by spot electroplating, such as by using a Hunter Micro-Metallizer Pen available from Hunter Products, Inc., Bridgewater, N.J. In FIG. 8, a patch, or plug, 62 is shown repairing hole 60. Any other suitable method may be used for repairing tiny holes resulting from etching the membrane.

The repairing step of the invented etching process also may be performed using a photolithographic method. In this case a light-sensitive, electrically insulating mask is applied to one surface of the membrane, and then the membrane is irradiated with light of the appropriate wavelength(s) from the opposite side. Any tiny holes that might be present in the membrane will allow the light to pass through the membrane and be absorbed by the light-sensitive mask. Next, the mask is washed to remove irradiated regions of the mask and thereby reveal the bare metal of the membrane. Because only the irradiated regions of the mask are removed, the remaining mask serves as an electrical insulator over the surface of the membrane. Then, all of the spots where the mask has been removed are electroplated or electrolessplated at the same time.

Because the patch, or plug, represents only a minute percentage of the surface area of the membrane, the patch may be formed from a material that is not hydrogen-permeable without the flux through the membrane being noticeably affected. Of course, a hydrogen-permeable and selective patch is preferred. Suitable metals for electroplating to fill or close tiny holes in the palladium-alloy membranes include copper, silver, gold, nickel, palladium, chromium, rhodium, and platinum. Volatile metals such as zinc, mercury, lead, bismuth and cadmium should be avoided. Furthermore, it is preferable that metal applied by plating be relatively free of phosphorous, carbon, sulfur and nitrogen, since these heteroatoms could contaminate large areas of the membrane and are generally known to reduce the permeability of palladium alloys to hydrogen.

While the invention has been disclosed in its preferred form, the specific embodiments thereof as disclosed and illustrated herein are not to be considered in a limiting sense as numerous variations are possible. Applicant regards the subject matter of the invention to include all novel and non-obvious combinations and subcombinations of the various elements, features, functions and/or properties disclosed herein. No single feature, function, element or property of the disclosed embodiments is essential. The following claims define certain combinations and subcombinations which are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicant's invention.

I claim:

1. A hydrogen-permeable metal membrane, comprising:
a hydrogen-permeable metal membrane formed at least substantially from a hydrogen permeable material containing at least one of palladium and a palladium alloy and having an etched region and an unetched region, and further wherein the etched region of the membrane has a thickness that is less than the thickness of the membrane in the unetched region.

2. The membrane of claim 1, wherein the unetched region at least partially surrounds the etched region.

3. The membrane of claim 2, wherein the unetched region surrounds the etched region.

4. The membrane of claim 3, wherein the membrane is coupled to a frame.

5. The membrane of claim 4, wherein at least a portion of the unetched region of the membrane is coupled to the frame.

6. The membrane of claim 1, wherein the thickness of the etched region is less than 20 microns.

7. The membrane of claim 6, wherein the thickness of the etched region is less than 15 microns.

8. The membrane of claim 1, wherein the etched region has a thickness that is less than approximately 80% of the thickness of the unetched region.

9. The membrane of claim 8, wherein the etched region has a thickness that is between approximately 40% and approximately 70% of the thickness of the unetched region.

10. The membrane of claim 1, wherein the etched region is adapted to produce a hydrogen flux therethrough that is greater than the hydrogen flux through an unetched hydrogen-permeable metal membrane having the same thickness as the etched region.

11. The membrane of claim 10, wherein the etched region is adapted to produce a hydrogen flux therethrough that is at least 5% greater than the hydrogen flux through an unetched hydrogen-permeable metal membrane having the same thickness as the etched region.

12. The membrane of claim 10, wherein the etched region is adapted to produce a hydrogen flux therethrough that is at least 20% greater than the hydrogen flux through an unetched hydrogen-permeable metal membrane having the same thickness as the etched region.

13. A method for forming a hydrogen-permeable metal membrane, comprising:
providing an absorbent medium, a hydrogen-permeable metal membrane containing at least one of palladium and a palladium alloy and having first and second opposed surfaces, and an etchant adapted to remove portions of the hydrogen-permeable membrane when applied to the membrane;
placing the absorbent medium on a selected one of the first and the second surfaces of the membrane to define an application region; and
applying a volume of the etchant to the absorbent medium, wherein the medium at least substantially confines the etchant to an application region and distributes the etchant throughout the region.

14. The method of claim 13, wherein the method further includes removing the medium and the etchant after a determined time period.

15. The method of claim 13, wherein the medium has a saturation volume of the etchant, and the volume of etchant applied to the medium does not exceed the saturation volume of the etchant.

16. The method of claim 13, wherein the method includes removing the medium and the etchant and repeating the placing and applying steps.

17. The method of claim 13, wherein the method further includes repeating the placing and applying steps with respect to another selected one of the first and the second surfaces of the membrane.

18. The method of claim 13, wherein the method includes removing the medium and the etchant, repeating the placing step to place a second absorbent medium on the application region and applying a second etchant to the second medium.

19. The method of claim 18, wherein the second etchant is less reactive, as applied to the membrane, than the previously applied etchant.

20. The method of claim 13, wherein the application region is smaller than the selected one of the surfaces of the membrane.

21. The method of claim 13, wherein the application region is at least substantially coextensive with one of the surfaces of the membrane.

22. The method of claim 13, wherein after the applying step, the method includes detecting any holes in the membrane.

23. The method of claim 22, wherein the method further includes repairing detected holes.

24. The method of claim 23, wherein the repairing step includes repairing detected holes by electroplating.

25. The method of claim 23, wherein the repairing step includes repairing detected holes by electroplating with a hydrogen-permeable material.

26. The method of claim 23, wherein the repairing step includes repairing detected holes by photolithography.

27. A method for preparing a hydrogen permeable metal membrane, comprising:
providing an etchant and a hydrogen permeable metal membrane that contains at least one of palladium and a palladium alloy and which includes a pair of opposed surfaces; and applying the etchant to a region of at least one of the surfaces of the membrane to reduce the thickness and increase the surface roughness of the membrane in the region compared to the thickness and surface roughness of the membrane prior to applying the etchant.

28. The method of claim 27, wherein the method further includes providing an absorbent medium and placing the medium on the region prior to applying the etchant.

29. The method of claim 27, wherein the method further includes providing a mask and placing the mask on the membrane to define the region to which the etchant is applied.

30. The method of claim 29, wherein the method further includes adhesively bonding the mask to the membrane prior to applying the etchant.

31. The method of claim 27, wherein the method further includes inspecting the membrane to detect any holes in the membrane and repairing a detected hole.

32. The method of claim 31, wherein the method includes repairing the detected hole by electroplating.

33. The method of claim 31, wherein the method includes repairing the detected hole by electrolessplating.

34. The method of claim 31, wherein the method includes repairing the detected hole by applying a photomask to a surface of the membrane, applying radiation to the other surface of the membrane, removing any of the photomask exposed to the radiation, and repairing the membrane in any region where the photomask was removed.

35. A method for forming a hydrogen-permeable metal membrane, comprising:

providing a hydrogen-permeable metal membrane having first and second opposed surfaces and an application region having a thickness;

providing an etchant adapted to remove portions of the hydrogen-permeable membrane when applied to the membrane; and step for etching the application region to reduce the thickness of the application region and to adapt the application region to produce a hydrogen flux that is at least as great as the hydrogen flux through a hydrogen-permeable metal membrane having a thickness equal to the thickness of the application region.

36. The method of claim 35, wherein the step for etching is adapted to produce a hydrogen flux through the application region that is greater than the hydrogen flux through a hydrogen-permeable metal membrane having a thickness equal to the thickness of the application region.

37. The method of claim 35, wherein the step for etching includes applying an absorbent medium over at least a portion of the application region.

38. The method of claim 35, wherein the step for etching includes applying a mask to a portion of the membrane at least partially surrounding the application region.

* * * * *